(12) United States Patent
Park et al.

(10) Patent No.: US 11,851,555 B2
(45) Date of Patent: Dec. 26, 2023

(54) POLYBUTENE DERIVATIVE FOR RUBBER COMPOUNDING AND RUBBER COMPOSITION INCLUDING SAME

(71) Applicant: DL Chemical CO., LTD., Seoul (KR)

(72) Inventors: Min Sup Park, Daejeon (KR); Myeong Seok Kim, Sejong-si (KR); Se Hyun Lee, Daejeon (KR)

(73) Assignee: DL Chemical CO., LTD., Seoul (KR)

( * ) Notice: Subject to any disclaimer, the term of this patent is extended or adjusted under 35 U.S.C. 154(b) by 167 days.

(21) Appl. No.: 17/379,411

(22) Filed: Jul. 19, 2021

(65) Prior Publication Data

US 2022/0025165 A1 Jan. 27, 2022

(30) Foreign Application Priority Data

Jul. 21, 2020 (KR) ........................ 10-2020-0090281

(51) Int. Cl.

| | | |
|---|---|---|
| *C08L 23/22* | (2006.01) | |
| *C08L 9/06* | (2006.01) | |
| *C08L 3/04* | (2006.01) | |
| *C08F 222/06* | (2006.01) | |
| *C08K 5/17* | (2006.01) | |
| *C08K 3/36* | (2006.01) | |
| *C08K 5/548* | (2006.01) | |
| *C08K 3/04* | (2006.01) | |
| *C08K 5/053* | (2006.01) | |
| *B60C 1/00* | (2006.01) | |

(52) U.S. Cl.
CPC ............ *C08L 23/22* (2013.01); *C08F 222/06* (2013.01); *C08K 3/04* (2013.01); *C08K 3/36* (2013.01); *C08K 5/053* (2013.01); *C08K 5/17* (2013.01); *C08K 5/548* (2013.01); *C08L 9/06* (2013.01); *B60C 1/0016* (2013.01); *C08L 2205/025* (2013.01); *C08L 2205/03* (2013.01)

(58) Field of Classification Search
CPC .. C08L 23/22; C08L 9/06; C08K 5/17; C08K 3/04; C08K 3/36; C08K 5/548; C08F 222/06
USPC ........................................................ 524/528
See application file for complete search history.

(56) References Cited

U.S. PATENT DOCUMENTS

| | | |
|---|---|---|
| 6,127,321 A | 10/2000 | Emert et al. |
| 8,637,606 B2 | 1/2014 | Pille-Wolf et al. |
| 9,752,020 B2 | 9/2017 | Wang et al. |
| 2003/0130140 A1 | 7/2003 | Harrison et al. |
| 2006/0223945 A1 | 10/2006 | Hollingshurst et al. |
| 2007/0149689 A1* | 6/2007 | Wang ............... C08L 51/06 524/502 |

FOREIGN PATENT DOCUMENTS

| | | |
|---|---|---|
| CN | 87100657 A | 9/1987 |
| CN | 1090586 A | 8/1994 |
| CN | 1093374 A | 10/1994 |
| CN | 1422940 A | 6/2003 |
| CN | 1995119 A | 7/2007 |
| CN | 101899330 A | 12/2010 |
| CN | 101945904 A | 1/2011 |
| CN | 102046671 A | 5/2011 |
| CN | 102131856 A | 7/2011 |
| CN | 111247179 A | 6/2020 |
| EP | 0 587 381 A1 | 3/1994 |
| JP | 8-176577 A | 7/1996 |
| JP | 9-165590 A | 6/1997 |
| JP | 2001-048929 A | 2/2001 |
| JP | 2001-131289 A | 5/2001 |
| JP | 2003-193077 A | 7/2003 |
| JP | 2007-182572 A | 7/2007 |
| JP | 2011-517723 A | 6/2011 |
| KR | 10-0871990 B1 | 12/2008 |
| KR | 10-2009-0096109 A | 9/2009 |
| KR | 10-2011-0072253 A | 6/2011 |
| KR | 10-2014-0066295 A | 6/2014 |
| KR | 10-2015-0024701 A | 3/2015 |
| KR | 10-2016-0002044 A | 1/2016 |
| KR | 10-2016-0005678 A | 1/2016 |
| KR | 10-1591276 B1 | 2/2016 |
| WO | 2009/129015 A1 | 10/2009 |

OTHER PUBLICATIONS

Office Action dated Mar. 7, 2023 in Japanese Application No. 2021-118935.
Office Action dated Jan. 10, 2022 from the Korean Intellectual Property Office in KR Application No. 10-2020-0090281.
Examination Report dated Feb. 3, 2022 from the Intellectual Property Office in IN Application No. 202124031877.
Office Action dated Sep. 22, 2023 from the Chinese Intellectual Property Office in CN Application No. 202110817534.3.

* cited by examiner

*Primary Examiner* — Deve V Hall
(74) *Attorney, Agent, or Firm* — Sughrue Mion, PLLC

(57) ABSTRACT

Disclosed is a polybutene derivative for rubber compounding. The polybutene derivative includes 30% to 98% by weight of polyisobutylene, 1% to 35% by weight of unsaturated dicarboxylic anhydride, and 1% to 50% by weight of at least one selected from among alkanolamines, amine-based compounds, and polyhydric alcohols. When the polybutene derivative is added as an additive for rubber, the polybutene derivative dramatically improves the dispersibility of a filler and improves both the grip performance and the rolling resistance at the same time.

18 Claims, No Drawings

POLYBUTENE DERIVATIVE FOR RUBBER COMPOUNDING AND RUBBER COMPOSITION INCLUDING SAME

CROSS REFERENCE TO RELATED APPLICATION

The present application claims priority to Korean Patent Application No. 10-2020-0090281, filed Jul. 21, 2020, the entire content of which is incorporated herein for all purposes by this reference.

BACKGROUND OF THE INVENTION

1. Field of the Invention

The present invention relates to a polybutene derivative for rubber compounding and a rubber composition including the same.

2. Description of the Related Art

Polybutene is a polymer having a number average molecular weight (Mn) of about 300 to 10,000 and obtained by polymerizing an olefin component having 4 carbon atoms (C4) obtained in a naphtha-cracking process using a Friedel-Craft-type catalyst.

What remains after extracting 1,3-butadiene from C4 feedstock is called C4 raffinate-1, and includes paraffins such as isobutane, normal butane, etc., and olefins such as 1-butene, 2-butene, isobutene, etc. Here, the content of isobutene in the C4 raffinate-1 is about 30% to 50% by weight. The C4 raffinate-1 is mainly used for the preparation of polybutene or methyl t-butylether (MTBE) serving as an octane number improver. Since the reactivity of isobutene is the highest among the olefin components of the C4 raffinate-1, the resulting polybutene is mainly composed of isobutene units. Polybutene increases in viscosity with increasing molecular weight thereof and has a viscosity of about 4 to 40,000 cSt (centi-stokes) at 100° C.

Korean Patent Application Publication No. 10-2011-0072253 discloses a method of improving the grip performance of a tire tread using highly reactive polybutene. Korean Patent Application Publication No. 10-2007-0096748 discloses a method of improving wear resistance, fuel efficiency, and braking performance using carboxylated liquid isoprene rubber. As such, efforts are being made to increase fuel efficiency and braking performance of rubber, specifically when applied to tire treads.

With regard to improving grip force, Korean Patent Application Publication No. 10-2016-0002044 discloses a composition exhibiting good grip performance and wear resistance under high-speed conditions due to the use of a masterbatch in which pellet-type plant resins such as sesame resin, sunflower resin, coconut resin and the like are added to styrene butadiene rubber. The grip force is a technique in which the surface of a tire is brought into close contact with the road surface, and it is advantageous for the tire to have superior elasticity to increase the grip force. However, when considering both grip force and rolling resistance, rolling resistance advantageously decreases with a decrease in closeness of contact with the road surface, so there is a tradeoff between the rolling resistance and the grip force of the tire. Specifically, a tire having low rolling resistance is advantageous in terms of fuel efficiency but may have poor contact with a surface road when the road is wet. Accordingly, recent tire development is progressing in a way to control both at the same time, rather than a one-dimensional approach of increasing either the rolling resistance or the grip force.

For example, Korean Patent Application Publication No. 10-2015-0024701 and U.S. Pat. No. 8,637,606 disclose the use of silica and a modified terpene phenol resin having a high softening point, in which the phenol increases compatibility with synthetic rubber to thus reduce the fluidity of the resin, thereby improving grip performance on wet surfaces without deteriorating rolling resistance. Korean Patent No. 10-1591276 discloses a rubber composition including 20 to 50 parts by weight of epoxidized natural rubber having a glass transition temperature (Tg) of −50° C. to −40° C., a Mooney viscosity of 60 to 80, and an epoxidation degree of 5% to 50%, thereby improving the braking power of tires on wet road surfaces, and uniformly improving low rolling resistance or fuel efficiency and durability without deteriorating wear resistance. Despite a variety of such attempts, there is still a need for a technique that can give satisfactory numerical values for both rolling resistance and grip force of tires.

CITATION LIST

Patent Literature (Patent Literature 1) Korean Patent Application Publication No. 10-2011-0072253
(Patent Literature 2) Korean Patent Application Publication No. 10-2007-0096748
(Patent Literature 3) Korean Patent Application Publication No. 10-2016-0002044
(Patent Literature 4) Korean Patent Application Publication No. 10-2015-0024701
(Patent Literature 5) U.S. Pat. No. 8,637,606
(Patent Literature 6) Korean Patent No. 10-1591276

SUMMARY OF THE INVENTION

An objective of the present invention is to provide a polybutene derivative for rubber compounding, which enables the preparation of a rubber composition capable of exhibiting improved processability, grip performance, and rolling resistance as well as high dispersibility when mixed with a filler.

The present invention provides a polybutene derivative for rubber compounding, prepared by mixing 30% to 98% by weight of polyisobutylene, 1% to 35% by weight of unsaturated dicarboxylic anhydride, and 1% to 50% by weight of one or two components selected from among alkanolamines, amine-based compounds, and polyhydric alcohols.

In the polybutene derivative for rubber compounding, according to one embodiment of the present invention, the polyisobutylene may have a number average molecular weight of 300 g/mol to 10,000 g/mol.

In the polybutene derivative for rubber compounding, according to one embodiment of the present invention, the polyisobutylene may have a polydispersity of 1 to 6.

In the polybutene derivative for rubber compounding, according to one embodiment of the present invention, the unsaturated dicarboxylic anhydride may be at least one selected from among maleic anhydride, itaconic anhydride, citraconic anhydride, propenyl succinic anhydride, and 2-pentendioic anhydride.

In the polybutene derivative for rubber compounding, according to one embodiment of the present invention, the alkanolamine may include an amino group and a hydroxyl group, the amine compound may include two or more amino groups, and the polyhydric alcohol may include two or more hydroxyl groups.

In the polybutene derivative for rubber compounding, according to one embodiment of the present invention, the alkanolamine may be represented by Chemical Formula 1 below, the amino compound may be represented by Chemical Formula 2 below, and the polyhydric alcohol may be represented by Chemical Formula 3 below.

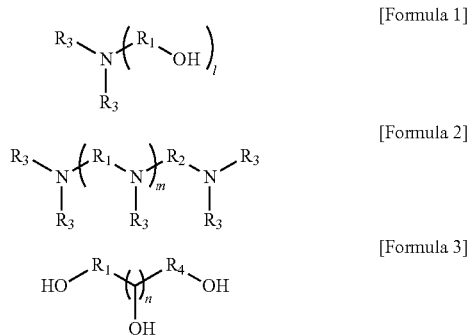

In Chemical Formulas 1 to 3, $R_1$ and $R_2$ are each independently C1-C9 alkylene group or a C1-C9 alkyl carbonylene group, $R_3$ is hydrogen, a C1-C9 alkyl group, or a C1-C9 alkyl carbonyl group, $R_4$ is a directly bound, a C1-C9 alkylene group, or a C1-C9 alkyl carbonyl group, 1 is a real number in a range of from 1 to 3, and m and n are each independently a real number in a range of from 0 to 6.

In the polybutene derivative for rubber compounding, according to one embodiment of the present invention, the alkanolamine may be at least one selected from among ethanolamine, diethanolamine, triethanolamine, aminomethanol, normal-propanolamine, isopropanolamine, diisopropanolamine, triisopropanolamine, butanolamine, dibutanolamine, tributanolamine, and 4-amino-1,2,3-butanetriol.

The amine-based compound may be at least one selected from among ethylene diamine, diethylenetriamine, triethylenetetraamine, tetraethylenepentaamine, pentaethylenehexaamine, hexaethyleneheptaamine, putrescine, spermidine, $N^1$-acetylspermidine, $N^8$-acetylspermidine, $N^1,N^{12}$-diacetylspermidine, cadaverine, spermine, thermospermine, caldopentamine, caldohexamine, tris(3-aminopropyl)amine, tris(2-aminoethyl)amine, tetrakis(3-aminopropyl)ammonium, cyclen, 1,4,7-triazacyclononane, 1,1,1-tris (aminomethyl)ethane, and subunits of polyethylenimine.

The polyhydric alcohol compound may be at least one selected from among ethylenediol, 1,2-propylenediol, glycerol, 1,3-propanediol, 1,2-butanediol, 1,2,3-butanetriol, 1,2,4-butanetriol, 1,2-pentanediol, 1,3,5-pentanetriol, 2,3,4-pentanetriol, 1,2,4-pentanetriol, 1,2,5-pentanetriol, 1,2-Hexanediol, 1,6-hexanediol, 1,2,6-hexanetriol, 1,2,3-hexanetriol, 1,2,5-hexanetriol, 1,2,4-hexanetriol 1,3,6-hexanetriol, 1,2-heptanediol, 1,2,3-heptanetriol, 1,2,7-heptanetriol, 1,4,5-heptanetriol, 1,4,7-heptanetriol, 1,2-octanediol, 1,1,3-octanetriol, 1,3,8-octanetriol, 2,3,7-octanetriol, 1,3,5-octanetriol, 1,2-nonanediol, 1,2-decanediol, sugar alcohol having 4 to 6 carbon atoms, and span.

In the polybutene derivative for rubber compounding, according to one embodiment of the present invention, the polybutene derivative for rubber compounding prepared using the alkanolamine may include at least one selected from among an imide group, an amide group, and an ester group.

In the polybutene derivative for rubber compounding, according to one embodiment of the present invention, the polybutene derivative for rubber compounding prepared using the amine-based compound may include at least one selected from among an imide group and an amide group.

In the polybutene derivative for rubber compounding, according to one embodiment of the present invention, the polybutene derivative for rubber compounding prepared using the polyhydric alcohol may include an ester group.

The polybutene derivative for rubber compounding, according to one embodiment of the present invention, may have a glass transition temperature of −40° C. or lower.

The polybutene derivative for rubber compounding, according to one embodiment of the present invention, may have a Brookfield viscosity of 1 to 10,000 cP at 150° C.

The polybutene derivative for rubber compounding, according to one embodiment of the present invention, may have a number average molecular weight of 500 to 15,000 g/mol and a polydispersity of 1 to 6.

The present invention also provides a rubber composition. The rubber composition according to one embodiment of the present invention includes a polybutene derivative for rubber compounding, a rubber base, and filler.

In the rubber composition according to one embodiment of the present invention, the filler may include at least one selected from silica and carbon black.

In the rubber composition according to one embodiment of the present invention, the rubber base may include at least one selected from among butadiene rubber, butyl rubber, emulsion polymerization styrene butadiene rubber (E-SBR), solution polymerization styrene butadiene rubber (S-SBR), epichlorohydrin rubber, nitrile rubber, hydrogenated nitrile rubber, brominated polyisobutylisoprene-co-paramethyl styrene (BIMS) rubber, urethane rubber, fluororubber, silicone rubber, styrene-ethylenebutadiene styrene copolymer rubber, ethylenepropylene rubber, ethylenepropylenediene monomer rubber, hypalon rubber, chloroprene rubber, ethylene vinyl acetate rubber, and acrylic rubber.

The rubber composition according to one embodiment of the present invention may include 50 to 150 parts by weight of silica, 5 to 20 parts by weight of carbon black, 2 to 40 parts by weight of a polybutene derivative for rubber compounding, and 2 to 15 parts by weight of a silane coupling agent, with respect to 100 parts by weight of the rubber base.

The polybutene derivative for rubber compounding, according to the present invention, is prepared by mixing 30% to 98% by weight of polyisobutylene, 1% to 35% by weight of an unsaturated dicarboxylic acid anhydride; and 1% to 50% by weight of one or more components selected from among alkanolamines, amine-based compounds, and polyhydric alcohols. When the polybutene derivative is applied to a rubber composition, the polybutene derivative improves the processability of rubber, remarkably improves the dispersibility of the filler, and enables the rubber composition to exhibit high grip performance and low rolling resistance.

DESCRIPTION OF THE PREFERRED EMBODIMENTS

The advantages and features of embodiments of the present invention and methods of achieving the same will be clarified with reference to examples described below in detail. However, the present invention is not limited to these embodiments, but may be modified in other forms. These embodiments are provided to fully convey the spirit of the present invention to those skilled in the art so that the contents introduced herein are thorough and complete, and the present invention is only defined by the scope of the claims. Like numbers refer to like elements throughout the following description herein.

Further, in describing embodiments of the present invention, well-known functions or constructions will not be described in detail since they may unnecessarily obscure the gist of the present invention. The following terms are defined in consideration of the functions in the examples of the present invention and thus may vary depending on the intentions of users, operators, or the like. Therefore, the definition of each term should be interpreted based on the contents throughout this specification.

According to the present invention, a polybutene derivative for rubber compounding is prepared by mixing 30% to 98% by weight of polyisobutylene, 1% to 35% by weight of unsaturated dicarboxylic anhydride, and 1% to 50% by weight of at least one selected from among alkanolamines, amine-based compounds, and polyhydric alcohols. When one or more components selected from among alkanolamines, amine-based compounds, and polyvalent alcohols is added and mixed with the rubber base and the filler to meet the range described above, the processability of rubber and the dispersibility of the filler may be improved.

The polybutene derivative according to one embodiment of the embodiment of the present invention may have a glass transition temperature of –40° C. or below. Preferably, the polybutene derivative may have a glass transition temperature in a range of –60 to –100° C., and more preferably in a range of –65 to –90° C. In addition, the polybutene derivative may have a viscosity in a range of 1 to 10,000 cP measured by a Brookfield viscometer at 150° C., and preferably in a range of 100 to 5,000 cP. When the glass transition temperature and viscosity of the polybutene derivative fall within the ranges, a storage modulus difference ($\Delta G'$) due to the Payne effect may be as low as 3.0 or less, preferably 2.7 or less, and most preferably 2.3 or less, upon subsequent mixing with the rubber base and the filler, indicating that the filler is uniformly dispersed. Here, $\Delta G'$ means $G'_{20\%}-G'_{0.02\%}$, which is a difference between storage modulus values measured at elongations of 0.02% and 20%, respectively.

In an embodiment of the present invention, the polybutene derivative has a number average molecular weight of 500 to 15,000 g/mol and a polydispersity of 1 to 6. When the polydispersity is greater than 6, there a problem in that the physical properties of rubber compositions containing the polybutene derivative largely vary. On the other hand, when the number average molecular weight is less than 500 g/mold, the production productivity of rubber is lowered because light polymers are generated in a large amount. Conversely, when the number average molecular weight exceeds 15,000 g/mol, there is a disadvantage that the production of rubber is not easy because a rubber production plant is overloaded due to the increased viscosity. With the polybutene derivative having properties falling within those ranges, rubber having a dynamic loss coefficient of 0.600 or greater at 0° C. and a dynamic loss coefficient of 0.1148 or less at 60° C. will be produced when being subsequently mixed with the rubber base and the filler. The dynamic loss coefficient at 0° C. is an indicator of the grip performance (wet grip). The higher the dynamic loss coefficient at 0° C., the better the grip performance. On the other hand, the dynamic loss coefficient at 60° C. is an indicator of the rolling resistance. the lower the dynamic loss coefficient at 60° C., the better the rolling resistance. That is, when the polybutene derivative according to one embodiment of the present invention is used to prepare rubber, there is an advantage in that the prepared rubber exhibits both the improved grip performance and the improved rolling resistance which were difficult to achieve in the related art.

More preferably, as will be described later, the appropriate number average molecular weight range, polydispersity range, viscosity range, glass transition temperature range, etc. of the polybutene derivative may vary depending on the type of the active hydrogen group-containing compound used in the reaction.

As a specific example, when the active hydrogen group-containing compound is alkanolamine, the polybutene derivative may have a number average molecular weight of 500 to 10,000 g/mol and a polydispersity of 1 to 6, and most preferably, a number average molecular weight of 1,000 to 5,000 g/mol and a polydispersity of 1 to 3. In addition, the polybutene derivative may have a glass transition temperature of –50° C. to –100° C. and preferably –60° C. to –90° C., and a viscosity of 50 to 10,000 cP measured by a Brookfield viscometer at 150° C. and preferably 100 to 5,000 cP. When all of the physical properties are satisfied, the storage modulus difference $\Delta G'$ ($=G'_{20\%}-G'_{0.02\%}$) value of the rubber prepared by mixing the polybutene derivative with the rubber base and filler may be lowered to 2.2 or less, and the standard in which the dynamic loss coefficient at 0° C. must be 0.6010 or greater and the dynamic loss coefficient at 60° C. must be 0.1120 or less can be satisfied.

As a specific example, when the active hydrogen group-containing compound is an amine-based compound, the polybutene derivative may have a number average molecular weight of 500 to 10,000 g/mol and a polydispersity of 1 to 5, and most preferably, a number average molecular weight of 1,000 to 5,000 g/mol and a polydispersity of 1 to 3. In addition, the polybutene derivative may have a glass transition temperature of –50° C. to –100° C. and preferably –60° C. to –90° C., and a viscosity of 50 to 10,000 cP measured by a Brookfield viscometer at 150° C. and preferably 150 to 5,000 cP. When all of the physical properties are satisfied, the storage modulus difference $\Delta G'$ ($=G'_{20\%}-G'_{0.02\%}$) value of the rubber prepared by mixing the polybutene derivative with the rubber base and filler may be lowered to 2.4 or less, and the standard in which the dynamic loss coefficient at 0° C. must be 0.6500 or greater and the dynamic loss coefficient at 60° C. must be 0.1130 or less can be satisfied.

As a specific example, when the active hydrogen group-containing compound is a polyhydric alcohol, the polybutene derivative may have a number average molecular weight of 1,000 to 15,000 g/mol and a polydispersity of 1 to 5, and most preferably, a number average molecular weight of 10,000 to 15,000 g/mol and a polydispersity of 1 to 3. In addition, the polybutene derivative may have a glass transition temperature of –40° C. to –100° C. and preferably –50° C. to –90° C., and a viscosity of 100 to 10,000 cP measured by a Brookfield viscometer at 150° C. and preferably 3,000 to 5,000 cP. When all of the physical properties are satisfied, the storage modulus difference $\Delta G'$ ($=G'_{20\%}-G'_{0.02\%}$) value of the rubber prepared by mixing the polybutene derivative with the rubber base and filler may be lowered to 2.7 or less, and the standard in which the dynamic loss coefficient at 0° C. must be 0.6020 or greater and the dynamic loss coefficient at 60° C. must be 0.1120 or less can be satisfied.

In the polybutene derivative according to one embodiment of the present invention, the polyisobutylene may have a number average molecular weight of 300 to 10,000 g/mol, preferably 400 to 6,000 g/mol, and most preferably 500 to 3,000 g/mol, and a polydispersity of 1 to 6, preferably 1 to 4, more preferably 1 to 3, and most preferably 1 to 2. In addition, the viscosity of the polyisobutylene measured by a Brookfield viscometer at 150° C. may be in a range of 1 to 10,000 cP, preferably in a range of 50 to 5,000 cP, and most preferably in a range of 100 to 1,000 cP. In addition, the polyisobutylene may have a terminal vinylidene (α-vinylidene) content of 80 mol % or more, and preferably 85 mol % or more, based on $^{13}$C-NMR. Here, the upper limit of the α-vinylidene content is not particularly limited, but may be, for example, 100 mol % or less, and particularly 95 mol % or less. Increasing the vinylidene content of the polyisobutylene is advantageous in that the reaction conversion rate and the active ingredient content in reactants increase. In addition, when the number average molecular weight of the polyisobutylene is less than 300 g/mol, a large amount of light polymer with low molecular weights may be generated in the polybutene derivative prepared. On the other hand, when the number average molecular weight of the polyisobutylene is more than 10,000 g/mol, there is a problem in that the viscosity of the produced polybutene derivative is overly high. When the polydispersity falls within a range of 1 to 6, it is possible to prepare a polybutene derivative having a uniform molecular weight, thereby reducing variations in physical properties of the prepared polybutene derivative.

In the polybutene derivative for rubber compounding, according to one embodiment of the present invention, the alkanolamine may be a compound represented by Chemical Formula 1 below, the amine-based compound may be a compound represented by Chemical Formula 2 below, and the polyhydric alcohol may be a compound represented by Chemical Formula 3 below.

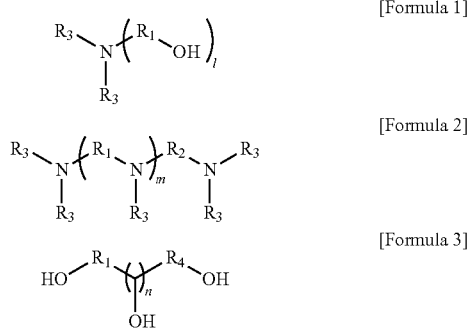

[Formula 1]

[Formula 2]

[Formula 3]

In Chemical Formulas 1 to 3, $R_1$ and $R_2$ are each independently a C1-C9 alkylene group or a C1-C9 alkyl carbonylene group, $R_3$ is hydrogen, a C1-C9 alkyl group, or a C1-C9 alkyl carbonyl group, $R_4$ is a directly bound, C1-C9 alkylene group or a C1-C9 alkyl carbonyl group, l is a real number in a range of from 1 to 3, and m and n are each independently a real number in a range of from 0 to 6.

More preferably, $R_1$ and $R_2$ are each independently a C1-C5 alkylene, $R_3$ is hydrogen, a C1-C5 alkyl group, or a C1-C5 alkyl carbonyl group, $R_4$ is a directly bound, C1-C5 alkylene group or a C1-C5 alkyl carbonyl group, l is a real number in a range of from 1 to 3, and m and n are each independently a real number in a range of from 0 to 4.

In Formula 3, a case where n is 0 means that $R_1$ and $R_4$ are directly bound.

When the polybutene derivative is prepared by selecting an amino alkylamine, an amine-based compound, and a polyhydric alcohol that satisfy the above-mentioned ranges, there is an advantage in that the dispersibility of the filler is further improved.

Specifically, the alkanolamine compound may be at least one selected from among ethanolamine, diethanolamine, triethanolamine, aminomethanol, normal-propanolamine, isopropanolamine, diisopropanolamine, triisopropanolamine, butanolamine, dibutanolamine, tributanolamine, and 4-amino-1,2,3-butanetriol.

The amine-based compound may be at least one selected from among ethylene diamine, diethylenetriamine, triethylenetetraamine, tetraethylenepentaamine, pentaethylenehexaamine, hexaethyleneheptaamine, putrescine, spermidine, $N^1$-acetylspermidine, $N^8$-acetylspermidine, $N^1$,$N^{12}$-diacetylspermidine, cadaverine, spermine, thermospermine, caldopentamine, caldohexamine, tris(3-aminopropyl)amine, tris(2-aminoethyl)amine, tetrakis(3-aminopropyl)ammonium, cyclen, 1,4,7-triazacyclononane, 1,1,1-tris(aminomethyl)ethane, and subunits of polyethylenimine.

The polyhydric alcohol compound may be at least one selected from among ethylenediol, 1,2-propylenediol, glycerol, 1,3-propanediol, 1,2-butanediol, 1,2,3-butanetriol, 1,2,4-butanetriol, 1,2-pentanediol, 1,3,5-pentanetriol, 2,3,4-pentanetriol, 1,2,4-pentanetriol, 1,2,5-pentanetriol, 1,2-Hexanediol, 1,6-hexanediol, 1,2,6-hexanetriol, 1,2,3-hexanetriol, 1,2,5-hexanetriol, 1,2,4-hexanetriol, 1,3,6-hexanetriol, 1,2-heptanediol, 1,2,3-heptanetriol, 1,2,7-heptanetriol, 1,4,5-heptanetriol, 1,4,7-heptanetriol, 1,2-octanediol, 1,1,3-octanetriol, 1,3,8-octanetriol, 2,3,7-octanetriol, 1,3,5-octanetriol, 1,2-nonanediol, 1,2-decanediol, sugar alcohol having 4 to 6 carbon atoms, and span.

In the polybutene derivative according to one embodiment of the present invention, the unsaturated dicarboxylic anhydride may be at least one selected from among maleic anhydride, itaconic anhydride, citraconic anhydride, propenyl succinic anhydride, and 2-pentendioic anhydride.

Furthermore, the polybutene derivative prepared by selecting one or more components selected from among polyisobutylene, unsaturated dicarboxylic acid anhydride and alkanolamine, amine-based compound, and polyhydric alcohol may contain nitrogen and/or oxygen, and preferably may contain a nitrogen atom and an oxygen atom that are joined through covalent bonding. In addition, the polybutene derivative may include an amide group, an imide group, or an ester group. Specifically, the polybutene derivative for rubber compounding, which is prepared using the alkanolamine, may include at least one selected from among an amide group, an imide group, and an ester group. The polybutene derivative for rubber compounding, prepared using an amine-based compound, may include one or more functional groups selected from among an amide group and an imide group. The polybutene derivative for rubber compounding, prepared using a polyhydric alcohol may include an ester group.

The present invention also provides a rubber composition.

The rubber composition according to one embodiment of the present invention includes the polybutene derivative for rubber compounding, according to one embodiment of the present invention, a rubber base, and a filler.

As described above, the rubber composition according to one embodiment of the present invention has the advantage of exhibiting improved processability due to the presence of the polybutene derivative, and the advantage of exhibiting both good grip performance and rolling resistance because the filler is uniformly dispersed.

In the rubber composition according to one embodiment of the present invention, the rubber base may include at least one selected from among butadiene rubber, butyl rubber, emulsion polymerization styrene butadiene rubber (E-SBR), solution polymerization styrene butadiene rubber (S-SBR), epichlorohydrin rubber, nitrile rubber, hydrogenated nitrile rubber, brominated polyisobutylisoprene-co-paramethyl styrene (BIMS) rubber, urethane rubber, fluororubber, silicone rubber, styrene-ethylenebutadiene styrene copolymer rubber, ethylenepropylene rubber, ethylenepropylenediene monomer rubber, hypalon rubber, chloroprene rubber, ethylene vinyl acetate rubber, and acrylic rubber. More preferably, the rubber base may include at least one selected from among butadiene rubber, styrene butadiene rubber (S-SBR), and butyl rubber.

More preferably, the rubber base may include styrene butadiene rubber, in which the styrene butadiene rubber has a styrene content of 9% to 19% and a vinyl group content of 10% to 54% in butadiene. Alternatively, the styrene butadiene rubber has a styrene content of 20% to 28% and a vinyl group content of 40% to 72% in butadiene. Further alternatively, the styrene butadiene rubber has a styrene content of 30% to 42% and a vinyl group content of 20% to 70% in butadiene.

In the rubber composition according to one embodiment of the present invention, the filler may be used without limitation, so long as it is a filler typically used in a rubber composition, preferably a rubber composition for tire treads, and the present invention is not limited thereto. As a specific and non-limiting example, the filler may include at least one selected from among silica and carbon black.

Here, the silica may be used without limitation, so long as it is silica particles used in rubber, preferably rubber for tire treads. Specifically, the silica may have a specific surface area (CTAB) of 80 to 300 $m^2/g$, preferably 110 to 220 $m^2/g$, more preferably 150 to 180 $m^2/g$, and most preferably 165 $m^2/g$. When the specific surface area thereof is less than the above lower limit, reinforcing properties may decrease and thus the strength thereof may be lowered. On the other hand, when the specific surface area thereof exceeds the above upper limit, the viscosity may increase upon rubber compounding, and dispersion may also be impeded.

The carbon black also may be used without limitation, so long as it is carbon black typically used in rubber for tire treads, and carbon black having a grade of 500 to 600 is preferably used. Specific and non-limiting examples thereof may include commercially available carbon black such as N110, N121, N134, N220, N231, N234, N242, N293, N299, S315, N326, N330, N332, N339, N343, N347, N351, N358, N375, N539, N550, N582, N630, N642, N650, N660, N683, N754, N762, N765, N774, N787, N907, N908, N990, N991, etc., but the present invention is not limited thereto.

Moreover, the rubber composition according to one embodiment of the present invention may further include a silane-coupling agent. Here, examples of the silane-coupling agent may include commercially available products such as Si-69 and the like and known materials such as bis-(3-triethoxysilylpropyl)tetrasulfane (TESPT), bis-(3-ethoxysilylpropyl)disulfane (ESPD), N-[2-(vinylbenzylamino)-3-aminopropyltrimethoxysilane] and the like, but the present invention is not limited thereto.

The rubber composition according to one embodiment of the present invention may include, with respect to 100 parts by weight of the rubber base, 50 to 150 parts by weight of silica, 5 to 20 parts by weight of carbon black, 2 to 40 parts by weight of the polybutene derivative, and 2 to 15 parts by weight of the silane-coupling agent. Preferably, the rubber composition may include, with respect to 100 parts by weight of the rubber base, 60 to 120 parts by weight of silica, 7 to 15 parts by weight of carbon black, 5 to 15 parts by weight of the polybutene derivative, and 3 to 10 parts by weight of the silane-coupling agent.

The rubber composition according to one embodiment of the present invention may further include an additive typically used in rubber compositions. As a specific and non-limiting example, the rubber composition may further include additional additives such as an antioxidant, an activator, a vulcanizing agent, a vulcanization accelerator, etc., and the amount of each of the added additives may vary depending on the type of additive and the use of rubber being manufactured. As a specific and non-limiting example, with respect to 100 parts by weight of the rubber base, 0.5 to 5 parts by weight of each additive may be added, but the present invention is not limited thereto.

As a specific and non-limiting example, the vulcanizing agent that is used may be sulfur, morpholine disulfide, etc., and the vulcanization accelerator may include at least one selected from among sulfenamide-based, thiazole-based, thiuram-based, thiourea-based, guanidine-based, dithiocarbamic-acid-based, aldehyde-amine-based, aldehyde-ammonia-based, imidazoline-based, and xanthate-based vulcanization accelerators.

Specifically, the sulfenamide-based vulcanization accelerator may include at least one sulfenamide-based compound selected from among CBS (N-cyclohexyl-2-benzothiazylsulfenamide), TBBS (N-tert-butyl-2-benzothiazylsulfenamide), N,N-dicyclohexyl-2-benzothiazylsulfenamide, N-oxydiethylene-2-benzothiazylsulfenamide and N, N-diisopropyl-2-benzothiazolesulfenamide, the thiazole-based vulcanization accelerator may include at least one thiazole-based compound selected from among MBT (2-mercaptobenzothiazole), MBTS (dibenzothiazyl disulfide), 2-mercaptobenzothiazole sodium salt, zinc salt, copper salt, cyclohexylamine salt, 2-(2,4-dinitrophenyl)mercaptobenzothiazole and 2-(2,6-diethyl-4-morpholinothio)benzothiazole, the thiuram-based vulcanization accelerator may include at least one thiuram-based compound selected from among TMTD (tetramethylthiuram disulfide), tetraethylthiuram disulfide, tetramethylthiuram monosulfide, dipentamethylenethiuram disulfide, dipentamethylenethiuram mono sulfide, dipentamethylenethiuram tetrasulfide, dipentamethylenethiuram hexasulfide, tetrabutylthiuram disulfide and pentamethylenethiuram tetrasulfide, the thiourea-based vulcanization accelerator may include at least one thiourea-based compound selected from among thiocarbamide, diethylthiourea, dibutylthiourea, trimethylthiourea and di(ortho-tolyl)thiourea, and the guanidine-based vulcanization accelerator may include at least one guanidine-based compound selected from among diphenylguanidine, di(ortho-tolyl)guanidine, triphenylguanidine, ortho-tolyl biguanide and diphenylguanidine phthalate, but the present invention is not limited thereto.

In addition, the present invention pertains to a tire tread including the rubber composition according to one embodiment of the present invention. The tire tread according to the present invention has superior grip performance and rolling resistance, as described above, and thus has an advantage of exhibiting excellent fuel efficiency compared to other tire treads under the same conditions. Specifically, the tire tread may be a tire tread used for a passenger car, an SUV, a bus, a truck, or an electric vehicle, but the present invention is not limited thereto.

A better understanding of the present invention will be given through the following examples and comparative examples. The following examples are merely set forth to illustrate the present invention and are not to be construed as limiting the scope of the present invention.

Synthesis Example 1-1

<Preparation of Polyisobutylene Succinic Anhydride (PIBSA-1)>

Polyisobutylene (product name: DAELIM HRPB1000, Mn: 992 g/mol, PD=1.4, α-vinylidene: 88.3 mol % based on $^{13}$C-NMR, viscosity: 193 cSt at 100° C., 500 g, 0.5 mol) and maleic anhydride (49 g, 0.2 mol) were placed in a 1 L autoclave and allowed to react at 230° C. for 12 hours using a mechanical stirrer. To remove unreacted maleic anhydride, nitrogen bubbling was performed for 2 hours. Thus, 431 g of polyisobutylene succinic anhydride [PIBSA-1] was obtained. The conversion rate thereof was determined to be 78.4% through column chromatography.

<Preparation of Polybutene Derivative>

The PIBSA-1 thus prepared (200 g, 0.18 mol) and glycerol (16.7 g, 0.18 mol) were added to 400 mL of xylene in a 1 L autoclave and allowed to react at 160° C. for 4 hours. Unreacted compounds were removed, after which 650 g of a polybutene derivative (yield: 96.9% by weight) was obtained.

The polybutene derivative thus obtained was determined to have a Brookfield viscosity of 475 cP at 150° C., a number average molecular weight of 2,939 g/mol (PD=3.4), and a glass transition temperature (Tg) of −67° C.

Synthesis Example 1-2

<Preparation of Polyisobutylene Succinic Anhydride (PIBSA-2)>

Polyisobutylene (Mn: 300 g/mol, PD-1.2, α-vinylidene: 81.6 mol % based on $^{13}$C-NMR, viscosity: 6 cSt at 40° C., 500 g, 1.67 mol) and maleic anhydride (172 g, 1.75 mol) were placed in a 1 L autoclave and allowed to react at 200° C. for 12 hours using a mechanical stirrer. To remove unreacted maleic anhydride, nitrogen bubbling was performed for 2 hours. Thus, 550 g of polyisobutylene succinic anhydride (PIBSA-2) was obtained. The conversion rate thereof was determined to be 79.1% through column chromatography.

<Preparation of Polybutene Derivative>

The PIBSA-2 thus prepared (200 g, 0.49 mol) and glycerol (47 g, 0.51 mol) were added to 200 mL of xylene in a 1 L autoclave and allowed to react at 160° C. for 4 hours. Unreacted compounds were removed, after which 220 g of a polybutene derivative (yield: 95.5% by weight) was obtained.

The polybutene derivative thus obtained was determined to have a Brookfield viscosity of 44 cP at 150° C., a number average molecular weight of 1,127 g/mol (PD=2.8), and a glass transition temperature of −70° C.

Synthesis Example 1-3

<Preparation of Polyisobutylene Succinic Anhydride (PIBSA-3)>

Polyisobutylene (Mn: 5,199 g/mol, PD=1.8, α-vinylidene: 87 mol % based on $^{13}$C-NMR, viscosity: 11,322 cSt at 100° C., 500 g, 0.1 mol) and maleic anhydride (10.0 g, 0.1 mol) were placed in a 1 L autoclave and allowed to react at 230° C. for 12 hours using a mechanical stirrer. To remove unreacted maleic anhydride, nitrogen bubbling was performed for 2 hours. Thus, 410 g of polyisobutylene succinic anhydride (PIBSA-3) was obtained. The conversion rate thereof was determined to be 70.4% through column chromatography.

<Preparation of Polybutene Derivative>

The PIBSA-3 thus prepared (200 g, 0.04 mol) and glycerol (3.7 g, 0.04 mol) were added to 500 mL of xylene in a 1 L autoclave and allowed to react at 160° C. for 4 hours. Unreacted compounds were removed, after which 195 g of a polybutene derivative (yield: 94.3% by weight) was obtained.

The polybutene derivative thus obtained was determined to have a Brookfield viscosity of 4,891 cP at 150° C., a number average molecular weight of 11,500 g/mol (PD=4.5), and a glass transition temperature of −54° C.

Synthesis Example 1-4

Polyisobutylene (Mn: 997 g/mol, PD=1.4, α-vinylidene: 68.3 mol % based on $^{13}$C-NMR, viscosity: 197 cSt at 100° C., 500 g, 0.5 mol) and maleic anhydride (52 g, 0.5 mol) were placed in a 1 L autoclave and allowed to react at 230° C. for 12 hours using a mechanical stirrer. To remove unreacted maleic anhydride, nitrogen bubbling was performed for 2 hours. Thus, 420 g of polyisobutylene succinic anhydride (PIBSA-4) was obtained. The conversion rate thereof was determined to be 73.4% through column chromatography.

<Preparation of Polybutene Derivative>

The PIBSA-4 thus prepared (200 g, 0.20 mol) and glycerol (18.4 g, 0.20 mol) were added to 400 mL of xylene in a 1 L autoclave and allowed to react at 160° C. for 4 hours. Unreacted compounds were removed, after which 200.0 g of a polybutene derivative (yield: 83.3% by weight) was obtained.

The polybutene derivative thus obtained was determined to have a Brookfield viscosity of 430 cP at 150° C., a number average molecular weight of 2,423 g/mol (PD=3.3), and a glass transition temperature (Tg) of −68° C.

Synthesis Example 2-1

<Preparation of Polyisobutylene Succinic Anhydride (PIBSA-1)>

Polyisobutylene (product name: DAELIM HRPB1000, Mn: 992 g/mol, PD=1.4, α-vinylidene: 88.3 mol % based on $^{13}$C-NMR, viscosity: 193 cSt at 100° C., 500 g, 0.5 mol) and maleic anhydride (49 g, 0.2 mol) were placed in a 1 L autoclave and allowed to react at 230° C. for 12 hours using a mechanical stirrer. To remove unreacted maleic anhydride, nitrogen bubbling was performed for 2 hours. Thus, 431 g of polyisobutylene succinic anhydride (PIBSA-1) was obtained. The conversion rate thereof was determined to be 78.4% through column chromatography.

<Preparation of Polybutene Derivative>

The PIBSA-1 thus prepared (200 g, 0.18 mol) and diethanolamine (19.1 g, 0.18 mol) were added to 400 mL of xylene in a 1 L autoclave and allowed to react at 160° C. for 4 hours. Unreacted compounds were removed, after which 212.0 g of a polybutene derivative (yield: 96.7% by weight) was obtained.

The polybutene derivative thus obtained was determined to have a Brookfield viscosity of 1,165 cP at 150° C., a number average molecular weight of 2,885 g/mol (PD=4.7), and a glass transition temperature of −69° C.

Synthesis Example 2-2

<Preparation of Polyisobutylene Succinic Anhydride (PIBSA-2)>

Polyisobutylene (Mn: 300 g/mol, PD=1.2, α-vinylidene: 81.6 mol % based on $^{13}$C-NMR, viscosity: 6 cSt at 40° C., 500 g, 1.67 mol) and maleic anhydride (172 g, 1.75 mol) were placed in a 1 L autoclave and allowed to react at 200° C. for 12 hours using a mechanical stirrer. To remove unreacted maleic anhydride, nitrogen bubbling was performed for 2 hours. Thus, 550 g of polyisobutylene succinic anhydride (PIBSA-2) was obtained. The conversion rate thereof was determined to be 79.1% through column chromatography.

<Preparation of Polybutene Derivative>

The PIBSA-2 thus prepared (200 g, 0.49 mol) and diethanolamine (52.5 g, 0.51 mol) were added to 400 mL of xylene in a 1 L autoclave and allowed to react at 160° C. for 4 hours. Unreacted compounds were removed, after which 225 g of a polybutene derivative (yield: 95.1% by weight) was obtained.

The polybutene derivative thus obtained was determined to have a Brookfield viscosity of 132 cP at 150° C., a number average molecular weight of 1,185 g/mol (PD=3.0), and a glass transition temperature of −70° C.

Synthesis Example 2-3

<Preparation of Polyisobutylene Succinic Anhydride (PIBSA-3)>

Polyisobutylene (Mn: 5,199 g/mol, PD=1.8, α-vinylidene: 87 mol % based on $^{13}$C-NMR, viscosity: 11,322 cSt at 100° C., 500 g, 0.1 mol) and maleic anhydride (10.0 g, 0.1 mol) were placed in a 1 L autoclave and allowed to react at 230° C. for 12 hours using a mechanical stirrer. To remove unreacted maleic anhydride, nitrogen bubbling was performed for 2 hours. Thus, 410 g of polyisobutylene succinic anhydride (PIBSA-3) was obtained. The conversion rate thereof was determined to be 70.4% through column chromatography.

<Preparation of Polybutene Derivative>

The PIBSA-3 thus prepared (200 g, 0.04 mol) and diethanolamine (4.1 g, 0.04 mol) were added to 500 mL of xylene in a 1 L autoclave and allowed to react at 160° C. for 4 hours. Unreacted compounds were removed, after which 187 g of a polybutene derivative (yield: 90.2% by weight) was obtained.

The polybutene derivative thus obtained was determined to have a Brookfield viscosity of 5,675 cP at 150° C., a number average molecular weight of 12,700 g/mol (PD=5.1), and a glass transition temperature of −52° C.

Synthesis Example 2-4

Polyisobutylene (Mn: 997 g/mol, PD=1.4, α-vinylidene: 68.3 mol % based on $^{13}$C-NMR, viscosity: 197 cSt at 100° C., 500 g, 0.5 mol) and maleic anhydride (52 g, 0.5 mol) were placed in a 1 L autoclave and allowed to react at 230° C. for 12 hours using a mechanical stirrer. To remove unreacted maleic anhydride, nitrogen bubbling was performed for 2 hours. Thus, 420 g of polyisobutylene succinic anhydride (PIBSA-4) was obtained. The conversion rate thereof was determined to be 73.4% through column chromatography.

<Preparation of Polybutene Derivative>

The PIBSA-4 thus prepared (200 g, 0.20 mol) and diethanolamine (22.0 g, 0.21 mol) were added to 400 mL of xylene in a 1 L autoclave and allowed to react at 160° C. for 4 hours. Unreacted compounds were removed, after which 200.0 g of a polybutene derivative (yield: 83.3% by weight) was obtained The polybutene derivative thus obtained was determined to have a Brookfield viscosity of 1,050 cP at 150° C., a number average molecular weight of 2,650 g/mol (PD=4.6), and a glass transition temperature of −70° C.

Synthesis Example 3-1

<Preparation of Polyisobutylene Succinic Anhydride (PIBSA-1)>

Polyisobutylene (product name: DAELIM HRPB1000, Mn: 992 g/mol, PD=1.4, α-vinylidene: 88.3 mol % based on $^{13}$C-NMR, viscosity: 193 cSt at 100° C., 500 g, 0.5 mol) and maleic anhydride (49 g, 0.2 mol) were placed in a 1 L autoclave and allowed to react at 230° C. for 12 hours using a mechanical stirrer. To remove unreacted maleic anhydride, nitrogen bubbling was performed for 2 hours. Thus, 431 g of polyisobutylene succinic anhydride (PIBSA-1) was obtained. The conversion rate thereof was determined to be 78.4% through column chromatography.

<Preparation of Polybutene Derivative>

The PIBSA-1 thus prepared (200 g, 0.18 mol) and triethylenetetramine (26.6 g, 0.18 mol) were added to 400 mL of xylene in a 1 L autoclave and allowed to react at 160° C. for 4 hours using a Dean-Stark apparatus. Unreacted compounds were removed, after which 216.6 g of a polybutene derivative (yield: 97.0% by weight) was obtained.

The polybutene derivative thus obtained was determined to have a Brookfield viscosity of 200 cP at 150° C., a number average molecular weight of 1,002 g/mol (PD=1.9), and a glass transition temperature (Tg) of −70° C.

Synthesis Example 3-2

<Preparation of Polyisobutylene Succinic Anhydride (PIBSA-2)>

Polyisobutylene (Mn: 300 g/mol, PD=1.2, α-vinylidene: 81.6 mol % based on $^{13}$C-NMR, viscosity: 6 cSt at 40° C., 500 g, 1.67 mol) and maleic anhydride (172 g, 1.75 mol) were placed in a 1 L autoclave and allowed to react at 200° C. for 12 hours using a mechanical stirrer. To remove unreacted maleic anhydride, nitrogen bubbling was performed for 2 hours. Thus, 550 g of polyisobutylene succinic anhydride (PIBSA-2) was obtained. The conversion rate thereof was determined to be 79.1% through column chromatography.

<Preparation of Polybutene Derivative>

The PIBSA-2 thus prepared (200 g, 0.49 mol) and triethylenetetramine (96.5 g, 0.51 mol) were added to 400 mL of xylene in a 1 L autoclave and allowed to react at 160° C. for 4 hours. Unreacted compounds were removed, after which 260 g of a polybutene derivative (yield: 93.5% by weight) was obtained.

The polybutene derivative thus obtained was determined to have a Brookfield viscosity of 69 cP at 150° C., a number average molecular weight of 537 g/mol (PD=1.5), and a glass transition temperature (Tg) of −65° C.

Synthesis Example 3-3

<Preparation of Polyisobutylene Succinic Anhydride (PIBSA-3)>

Polyisobutylene (Mn: 5,199 g/mol, PD=1.8, α-vinylidene: 87 mol % based on $^{13}$C-NMR, viscosity: 11,322 cSt at 100° C., 500 g, 0.1 mol) and maleic anhydride (10.0 g, 0.1 mol) were placed in a 1 L autoclave and allowed to react at 230° C. for 12 hours using a mechanical stirrer. To remove unreacted maleic anhydride, nitrogen bubbling was performed for 2 hours. Thus, 410 g of polyisobutylene succinic anhydride (PIBSA-3) was obtained. The conversion rate thereof was determined to be 70.4% through column chromatography.

<Preparation of Polybutene Derivative>

The PIBSA-3 thus prepared (200 g, 0.04 mol) and triethylenetetramine (7.6 g, 0.04 mol) were added to 500 mL of xylene in a 1 L autoclave and allowed to react at 160° C. for 4 hours. Unreacted compounds were removed, after which 200 g of a polybutene derivative (yield: 91.5% by weight) was obtained.

The polybutene derivative thus obtained was determined to have a Brookfield viscosity of 2,000 cP at 150° C., a number average molecular weight of 5,441 g/mol (PD=3.5), and a glass transition temperature (Tg) of −61° C.

Synthesis Example 3-4

Polyisobutylene (Mn: 997 g/mol, PD=1.4, α-vinylidene: 68.3 mol % based on $^{13}$C-NMR, viscosity: 197 cSt at 100° C., 500 g, 0.5 mol) and maleic anhydride (52 g, 0.5 mol) were placed in a 1 L autoclave and allowed to react at 230° C. for 12 hours using a mechanical stirrer. To remove unreacted maleic anhydride, nitrogen bubbling was performed for 2 hours. Thus, 420 g of polyisobutylene succinic anhydride (PIBSA-4) was obtained. The conversion rate thereof was determined to be 73.4% through column chromatography.

<Preparation of Polybutene Derivative>

The PIBSA-4 thus prepared (200 g, 0.20 mol) and triethylenetetramine (38.0 g, 0.2 mol) were added to 400 mL of xylene in a 1 L autoclave and allowed to react at 160° C. for 4 hours using a Dean-Stark apparatus. Unreacted compounds were removed, after which 220 g of a polybutene derivative (yield: 85.3% by weight) was obtained.

The polybutene derivative thus obtained was determined to have a Brookfield viscosity of 175 cP at 150° C., a number average molecular weight of 1,100 g/mol (PD=1.8), and a glass transition temperature of −69° C.

Synthesis Example 4-1

<Preparation of Polyisobutylene Succinic Anhydride (PIBSA-1)>

Polyisobutylene (product name: DAELIM HRPB1000, Mn: 992 g/mol, PD=1.4, α-vinylidene: 88.3 mol % based on $^{13}$C-NMR, viscosity: 193 cSt at 100° C., 500 g, 0.5 mol) and maleic anhydride (49 g, 0.2 mol) were placed in a 1 L autoclave and allowed to react at 230° C. for 12 hours using a mechanical stirrer. To remove unreacted maleic anhydride, nitrogen bubbling was performed for 2 hours. Thus, 431 g of polyisobutylene succinic anhydride (PIBSA-1) was obtained. The conversion rate thereof was determined to be 78.4% through column chromatography.

<Preparation of Polybutene Derivative>

The PIBSA-1 thus prepared (200 g, 0.18 mol) and sorbitol (33.1 g, 0.18 mol) were added to 400 mL of xylene in a 1 L autoclave and allowed to react at 160° C. for 4 hours. Unreacted compounds were removed, after which 224.5 g of a polybutene derivative (yield: 96.3% by weight) was obtained.

The polybutene derivative thus obtained was determined to have a Brookfield viscosity of 800 cP at 150° C., a number average molecular weight of 2,338 g/mol (PD=2.7), and a glass transition temperature (Tg) of −67° C.

Synthesis Example 4-2

<Preparation of Polyisobutylene Succinic Anhydride (PIBSA-2)>

Polyisobutylene (Mn: 300 g/mol, PD=1.2, α-vinylidene: 81.6 mol % based on $^{13}$C-NMR, viscosity: 6 cSt at 40° C., 500 g, 1.67 mol) and maleic anhydride (172 g, 1.75 mol) were placed in a 1 L autoclave and allowed to react at 200° C. for 12 hours using a mechanical stirrer. To remove unreacted maleic anhydride, nitrogen bubbling was performed for 2 hours. Thus, 550 g of polyisobutylene succinic anhydride (PIBSA-2) was obtained. The conversion rate thereof was determined to be 79.1% through column chromatography.

<Preparation of Polybutene Derivative>

The PIBSA-2 thus prepared (200 g, 0.49 mol) and sorbitol (92.8 g, 0.51 mol) were added to 400 mL of xylene in a 1 L autoclave and allowed to react at 160° C. for 4 hours. Unreacted compounds were removed, after which 255 g of a polybutene derivative (yield: 92.9% by weight) was obtained.

The polybutene derivative thus obtained was determined to have a Brookfield viscosity of 48 cP at 150° C., a number average molecular weight of 537 g/mol (PD=1.5), and a glass transition temperature (Tg) of −55° C.

Synthesis Example 4-3

<Preparation of Polyisobutylene Succinic Anhydride (PIBSA-3)>

Polyisobutylene (Mn: 5,199 g/mol, PD=1.8, α-vinylidene: 87.0 mol % based on $^{13}$C-NMR, viscosity: 11,322 cSt at 100° C., 500 g, 0.1 mol) and maleic anhydride (10.0 g, 0.1 mol) were placed in a 1 L autoclave and allowed to react at 230° C. for 12 hours using a mechanical stirrer. To remove unreacted maleic anhydride, nitrogen bubbling was performed for 2 hours. Thus, 410 g of polyisobutylene succinic anhydride (PIBSA-3) was obtained. The conversion rate thereof was determined to be 70.4% through column chromatography.

<Preparation of Polybutene Derivative>

The PIBSA-3 thus prepared (200 g, 0.04 mol) and sorbitol (7.3 g, 0.04 mol) were added to 500 mL of xylene in a 1 L autoclave and allowed to react at 160° C. for 4 hours. Unreacted compounds were removed, after which 205 g of a polybutene derivative (yield: 93.9% by weight) was obtained.

The polybutene derivative thus obtained was determined to have a Brookfield viscosity of 7,100 cP at 150° C., a number average molecular weight of 14,780 g/mol (PD=4.5), and a glass transition temperature (Tg) of −55° C.

Synthesis Example 4-4

Polyisobutylene (Mn: 997 g/mol, PD=1.4, α-vinylidene: 68.3 mol % based on $^{13}$C-NMR, viscosity: 197 cSt at 100° C., 500 g, 0.5 mol) and maleic anhydride (52 g, 0.5 mol) were placed in a 1 L autoclave and allowed to react at 230°

C. for 12 hours using a mechanical stirrer. To remove unreacted maleic anhydride, nitrogen bubbling was performed for 2 hours. Thus, 420 g of polyisobutylene succinic anhydride (PIBSA-4) was obtained. The conversion rate thereof was determined to be 73.4% through column chromatography.

<Preparation of Polybutene Derivative>

The PIBSA-4 thus prepared (200 g, 0.20 mol) and sorbitol (37.0 g, 0.18 mol) were added to 400 mL of xylene in a 1 L autoclave and allowed to react at 160° C. for 4 hours using a Dean-Stark apparatus. Unreacted compounds were removed, after which 200 g of a polybutene derivative (yield: 78.0% by weight) was obtained.

The polybutene derivative thus obtained was determined to have a Brookfield viscosity of 760 cP at 150° C., a number average molecular weight of 2,210 g/mol (PD=2.6), and a glass transition temperature of −69° C.

The types and physical properties of the compounds used in each of the above synthesis examples and the physical properties of the polybutene derivative produced through the polymerization are described in Tables 1 and 2 below, respectively.

TABLE 1

|  | Polyisobutylene | | α-vinylidene (mol %) | dicarboxylic anhydride | Active hydrogen group-containing compound |
| --- | --- | --- | --- | --- | --- |
|  | Mn (g/mol) | PD | | | |
| Synthesis Example 1-1 | 992 | 1.4 | 88.3 | Maleic anhydride | glycerol |
| Synthesis Example 1-2 | 300 | 1.2 | 81.6 | | |
| Synthesis Example 1-3 | 5,199 | 1.8 | 87.0 | | |
| Synthesis Example 1-4 | 997 | 1.4 | 86.3 | | |
| Synthesis Example 2-1 | 992 | 1.4 | 88.3 | Maleic anhydride | diethanol amine |
| Synthesis Example 2-2 | 300 | 1.2 | 81.6 | | |
| Synthesis Example 2-3 | 5,199 | 1.8 | 87.0 | | |
| Synthesis Example 2-4 | 997 | 1.4 | 68.3 | | |
| Synthesis Example 3-1 | 992 | 1.4 | 88.3 | Maleic anhydride | triethylene tetramine |
| Synthesis Example 3-2 | 300 | 1.2 | 81.6 | | |
| Synthesis Example 3-3 | 5,199 | 1.8 | 87.0 | | |
| Synthesis Example 3-4 | 997 | 1.4 | 68.3 | | |
| Synthesis Example 4-1 | 992 | 1.4 | 88.3 | Maleic anhydride | sorbitol |
| Synthesis Example 4-2 | 300 | 1.2 | 81.6 | | |
| Synthesis Example 4-3 | 5,199 | 1.8 | 87.0 | | |
| Synthesis Example 4-4 | 997 | 1.4 | 68.3 | | |

TABLE 2

|  | Polyisobutylene | | | |
| --- | --- | --- | --- | --- |
|  | Mn (g/mol) | PD | Viscosity at 150° C. (cP) | Tg (° C.) |
| Synthesis Example 1-1 | 2,939 | 3.4 | 475 | −67 |
| Synthesis Example 1-2 | 1,127 | 2.8 | 44 | −70 |
| Synthesis Example 1-3 | 11,500 | 4.5 | 4,891 | −54 |
| Synthesis Example 1-4 | 2,423 | 3.3 | 430 | −68 |
| Synthesis Example 2-1 | 2,855 | 4.7 | 1,165 | −69 |
| Synthesis Example 2-2 | 1,185 | 3.0 | 132 | −70 |
| Synthesis Example 2-3 | 12,700 | 5.1 | 5,675 | −52 |
| Synthesis Example 2-4 | 2,650 | 4.6 | 1,050 | −70 |
| Synthesis Example 3-1 | 1,002 | 1.9 | 200 | −68 |
| Synthesis Example 3-2 | 537 | 1.5 | 69 | −65 |
| Synthesis Example 3-3 | 5,441 | 3.5 | 2,000 | −61 |
| Synthesis Example 3-4 | 1,100 | 1.8 | 175 | −69 |
| Synthesis Example 4-1 | 2,338 | 2.7 | 800 | −67 |
| Synthesis Example 4-2 | 537 | 1.5 | 48 | −55 |
| Synthesis Example 4-3 | 14,780 | 4.5 | 7,100 | −55 |
| Synthesis Example 4-4 | 2,210 | 2.6 | 760 | −69 |

Preparation Examples 1-1 to 4-3 for Rubber

A rubber base was prepared by mixing 40 parts by weight of styrene butadiene rubber 1 (styrene: 10%, vinyl: 40%, SBR1) and 82.5 parts by weight of styrene butadiene rubber 2 (styrene: 33%, vinyl: 48%, SBR2). After that, with respect to 100 parts by weight of the rubber base, 10 parts by weight of carbon black, 80 parts by weight of silica (US7000GR, Evonik, CTAB 165 m²/g), 6.4 parts by weight of Si-69 as a silane-coupling agent, 8.1 parts by weight of oil (treated distillate aromatic extracted, TDAE), 3.0 parts by weight of zinc oxide, 2.0 parts by weight of stearic acid, 1.6 parts by weight of sulfur (manufactured by Miwon Chemicals Co., Ltd.) as a vulcanizing agent, 1.6 parts by weight of N-cyclohexyl-2-benzothiazylsulfenamide (CBS) as a vulcanization accelerator, 2 parts by weight of diphenyl guanidine (DPG), and 10 parts by weight of the polybutene derivative prepared in one of Synthesis Examples 1-1 to 1-3, 2-1 to 2-3, 3-1 to 3-3, and 4-1 to 4-3 were mixed using an internal Banbury mixer to prepare a masterbatch. After that, the mixture was further mixed using an open twin-screw roll mill, followed by vulcanization at 165° C. for 10 min, thereby manufacturing rubber. The components and amounts of the rubber composition are shown in Table 3 below.

Comparative Example 1

Rubber was manufactured in the same manner as in Preparation Example 1-1, with the exception that a rubber composition was prepared by mixing 10 parts by weight of commercially available terpene phenolic resin Chemical T160 (manufactured by Yasuhara Chemical Co., Ltd.), rather than the polybutene derivative.

Comparative Example 2

Rubber was manufactured in the same manner as in Preparation Example 1-1, with the exception that a rubber composition was prepared by mixing 10 parts by weight of rubber-compounding oil (TDAE), instead of the polybutene derivative. That is, in this comparative example, the rubber-compounding oil (TDAE) was used in a total amount of 18.1 parts by weight.

Comparative Example 3

Rubber was manufactured in the same manner as in Preparation Example 1-1, with the exception that a rubber composition was prepared by mixing 10 parts by weight of the polyisobutylene succinic anhydride [PIBSA-1] prepared in Synthesis Example 1-1, rather than the polybutene derivative.

Comparative Example 4

Rubber was manufactured in the same manner as in Preparation Example 1-1, with the exception that a rubber composition was prepared by mixing 10 parts by weight of the polybutene derivative prepared in Synthesis Example 1-4, rather than any of the polybutene derivatives prepared in the synthesis examples mentioned in Preparation Example 1-1.

Comparative Example 5

Rubber was manufactured in the same manner as in Preparation Example 1-1, with the exception that a rubber composition was prepared by mixing 10 parts by weight of the polybutene derivative prepared in Synthesis Example 2-4, rather than any of the polybutene derivatives prepared in the synthesis examples mentioned in Preparation Example 1-1.

Comparative Example 6

Rubber was manufactured in the same manner as in Preparation Example 1-1, with the exception that a rubber composition was prepared by mixing 10 parts by weight of the polybutene derivative prepared in Synthesis Example 3-4, rather than any of the polybutene derivatives prepared in the synthesis examples mentioned in Preparation Example 1-1.

Comparative Example 7

Rubber was manufactured in the same manner as in Preparation Example 1-1, with the exception that a rubber composition was prepared by mixing 10 parts by weight of the polybutene derivative prepared in Synthesis Example 4-4, rather than any of the polybutene derivatives prepared in the synthesis examples mentioned in Preparation Example 1-1.

TABLE 3

| Classification (phr) | | Comp. Ex. 1 | Comp. Ex. 2 | Comp. Ex. 3 | Comp Ex. 4 | Comp. Ex. 5 | Comp. Ex. 6 | Comp. Ex. 7 | Ex. 1-1 | Ex. 2-1 | Ex. 3-1 | Ex. 4-1 |
|---|---|---|---|---|---|---|---|---|---|---|---|---|
| Polymer | SBR1 | 40 | 40 | 40 | 40 | 40 | 40 | 40 | 40 | 40 | 40 | 40 |
|  | SBR2 | 82.5 | 82.5 | 82.5 | 82.5 | 82.5 | 82.5 | 82.5 | 82.5 | 82.5 | 82.5 | 82.5 |
| Filler | Silica | 80 | 80 | 80 | 80 | 80 | 80 | 80 | 80 | 80 | 80 | 80 |
|  | Carbon Black | 10 | 10 | 10 | 10 | 10 | 10 | 10 | 10 | 10 | 10 | 10 |
|  | Silane (Si-69) | 6.4 | 6.4 | 6.4 | 6.4 | 6.4 | 6.4 | 6.4 | 6.4 | 6.4 | 6.4 | 6.4 |
| Oil & Chemical | Oil (TDAE) | 8.1 | 18.1 | 8.1 | 8.1 | 8.1 | 8.1 | 8.1 | 8.1 | 8.1 | 8.1 | 8.1 |
|  | Terepene Resin | 10 | — | — | — | — | — | — | — | — | — | — |
|  | PIBSA-1 | — | — | 10 | — | — | — | — | — | — | — | — |
|  | Synthesis Ex. 1-4 | — | — | — | 10 | — | — | — | — | — | — | — |
|  | Synthesis Ex. 2-4 | — | — | — | — | 10 | — | — | — | — | — | — |
|  | Synthesis Ex. 3-4 | — | — | — | — | — | 10 | — | — | — | — | — |
|  | Synthesis Ex. 4-4 | — | — | — | — | — | — | 10 | — | — | — | — |
|  | Synthesis Ex. 1-1 | — | — | — | — | — | — | — | 10 | — | — | — |
|  | Synthesis Ex. 2-1 | — | — | — | — | — | — | — | — | 10 | — | — |
|  | Synthesis Ex. 3-1 | — | — | — | — | — | — | — | — | — | 10 | — |
|  | Synthesis Ex. 4-1 | — | — | — | — | — | — | — | — | — | — | 10 |
|  | ZnO | 3 | 3 | 3 | 3 | 3 | 3 | 3 | 3 | 3 | 3 | 3 |
|  | Stearic-acid | 2 | 2 | 2 | 2 | 2 | 2 | 2 | 2 | 2 | 2 | 2 |
| Final MB | Sulfur | 1.6 | 1.6 | 1.6 | 1.6 | 1.6 | 1.6 | 1.6 | 1.6 | 1.6 | 1.6 | 1.6 |
|  | CBS | 1.6 | 1.6 | 1.6 | 1.6 | 1.6 | 1.6 | 1.6 | 1.6 | 1.6 | 1.6 | 1.6 |
|  | DPG | 2 | 2 | 2 | 2 | 2 | 2 | 2 | 2 | 2 | 2 | 2 |

TABLE 4

| Classification (phr) | | Ex. 1-2 | Ex. 1-3 | Ex. 2-2 | Ex. 2-3 | Ex. 3-2 | Ex. 3-3 | Ex. 4-2 | Ex. 4-3 |
|---|---|---|---|---|---|---|---|---|---|
| Polymer | SBR1 | 40 | 40 | 40 | 40 | 40 | 40 | 40 | 40 |
|  | SBR2 | 82.5 | 82.5 | 82.5 | 82.5 | 82.5 | 82.5 | 82.5 | 82.5 |
| Filler | Silica | 80 | 80 | 80 | 80 | 80 | 80 | 80 | 80 |
|  | Carbon Black | 10 | 10 | 10 | 10 | 10 | 10 | 10 | 10 |
|  | Silane (Si-69) | 6.4 | 6.4 | 6.4 | 6.4 | 6.4 | 6.4 | 6.4 | 6.4 |
| Oil & Chemical | Oil (TDAE) | 8.1 | 8.1 | 8.1 | 8.1 | 8.1 | 8.1 | 8.1 | 8.1 |
|  | Synthesis Ex. 1-2 | 10 | — | — | — | — | — | — | — |
|  | Synthesis Ex. 1-3 | — | 10 | — | — | — | — | — | — |
|  | Synthesis Ex. 2-2 | — | — | 10 | — | — | — | — | — |
|  | Synthesis Ex. 2-3 | — | — | — | 10 | — | — | — | — |
|  | Synthesis Ex. 3-2 | — | — | — | — | 10 | — | — | — |
|  | Synthesis Ex. 3-3 | — | — | — | — | — | 10 | — | — |
|  | Synthesis Ex. 4-2 | — | — | — | — | — | — | 10 | — |
|  | Synthesis Ex. 4-3 | — | — | — | — | — | — | — | 10 |
|  | ZnO | 3 | 3 | 3 | 3 | 3 | 3 | 3 | 3 |
|  | Stearic-acid | 2 | 2 | 2 | 2 | 2 | 2 | 2 | 2 |
| Final MB | Sulfur | 1.6 | 1.6 | 1.6 | 1.6 | 1.6 | 1.6 | 1.6 | 1.6 |
|  | CBS | 1.6 | 1.6 | 1.6 | 1.6 | 1.6 | 1.6 | 1.6 | 1.6 |
|  | DPG | 2 | 2 | 2 | 2 | 2 | 2 | 2 | 2 |

[Evaluation of Rubber Properties]

The properties of the prepared rubber compositions were measured through the methods described below. Considering that some properties of the rubber composition vary depending on the surrounding environmental conditions, results obtained under the same conditions on the same day are shown in Tables 4 and 5 below.

1) Evaluation of Payne Effect

The Payne effect is associated with storage modulus values measured at elongations of 0.02% and 20%, and the smaller the change, the better the dispersion of silica, whereby superior rolling resistance can be obtained and thus the general properties of the rubber can be improved. For the rubber manufactured in Examples and Comparative Examples, the Payne effect value was measured in a 0.02-20% strain sweep at a rate of 1 Hz at 60° C. using a sample having a weight of 7 g or more and an RPA 2000 from ALPHA Technologies Ltd., and the difference ($\Delta G'=G'_{20\%}-G'_{0.02\%}$) between the storage modulus values measured at elongations of 0.02% and 20% was determined, and the results thereof are shown in Table 5 below.

2) Measurement of Grip Performance and Rolling Resistance Through Dynamic Loss Coefficient The tan δ value at 0° C. corresponds to braking force on wet road surfaces, and the higher this value, the better the grip force, whereas the tan δ value at 60° C. corresponds to rolling resistance, and the lower this value, the better the rolling resistance [M. J. Wang, Rubber. Chem. Technol., 71, 520 (1998)]. For each of the rubbers manufactured in Examples and Comparative Examples, the dynamic loss coefficients at 0° C. and 60° C. were measured using dynamic mechanical thermal spectrometry (DMTS) (GABO, EPLEXOR 500N) and the glass transition temperature (Tg) was measured, and the results thereof are shown in Table 5 below. Here, the measurement conditions were as follows: frequency: 10 Hz, strain (static strain: 3%, dynamic strain: 0.25%), and temperature: −60° C. to 70° C.

TABLE 5

| | Payne Effect | IMA | | |
|---|---|---|---|---|
| | $\Delta G'$_non-vulcanization | Tg (° C.) | tanδ at 0° C. | Tanδ at 60° C. |
| Comp. Ex. 1 | 3.4 | −5.6 | 0.6832 | 0.1258 |
| Comp. Ex. 2 | 3.3 | −9.4 | 0.5757 | 0.1149 |
| Comp. Ex. 3 | 2.8 | −10.4 | 0.6010 | 0.1150 |
| Comp. Ex. 4 | 2.2 | −8.0 | 0.6212 | 0.1212 |
| Comp. Ex. 5 | 2.3 | −9.7 | 0.6044 | 0.1158 |
| Comp. Ex. 6 | 2.5 | −8.0 | 0.6664 | 0.1183 |
| Comp. Ex. 7 | 2.6 | −8.8 | 0.6020 | 0.1180 |
| Example 1-1 | 2.0 | −7.7 | 0.6153 | 0.1115 |
| Example 1-2 | 2.2 | −8.1 | 0.6103 | 0.1075 |
| Example 1-3 | 2.3 | −7.6 | 0.6309 | 0.1115 |
| Example 2-1 | 2.1 | −9.3 | 0.6011 | 0.1114 |
| Example 2-2 | 2.1 | −9.6 | 0.6041 | 0.1096 |
| Example 2-3 | 2.2 | −9.4 | 0.6171 | 0.1116 |
| Example 3-1 | 2.3 | −7.3 | 0.6649 | 0.1114 |
| Example 3-2 | 2.4 | −7.5 | 0.6518 | 0.1095 |
| Example 3-3 | 2.3 | −7.2 | 0.6782 | 0.1123 |
| Example 4-1 | 2.6 | −8.6 | 0.6023 | 0.1148 |
| Example 4-2 | 2.7 | −9.0 | 0.6023 | 0.1108 |
| Example 4-3 | 2.7 | −8.7 | 0.6089 | 0.1146 |

With reference to Table 5, in the case of the $\Delta G'$ value representing the extent of dispersion of filler, such as carbon black and silica, all of the examples exhibited 2.7 or less while all of the comparative examples exhibited 2.8 or more. The results show that the polybutene derivative according to the embodiment of the present invention improves the dispersibility of silica and carbon black. Specifically, in the case of Examples 1-1 to 3-3, all of the $\Delta G'$ values were 2.4 or less, indicating more excellent filler dispersibility, and in the case of Example 1-1, the $\Delta G'$ value was 2.0, indicating the best filler dispersibility. On the other hand, in the case of the rubbers to which the polybutene derivative prepared through Synthesis Examples 4-1 to 4-3 is applied, the $\Delta G'$ value was 2.6 to 2.7, which was superior in dispersibility to the comparative examples, but was somewhat less effective than in the other examples.

In addition, in the case of 0° C. Tan δ which indicates better grip performance as the number thereof increases, the rubbers of the examples exhibited 0.6 or more, specifically 0.6011 or more, and in the case of 60° C. Tan δ which indicates a better rolling resistance as the value thereof decreases, the rubbers of the examples exhibited a value of 0.1148 or less. This means that the rubbers prepared according to the examples of the present invention exhibit excellent grip performance and excellent rolling resistance, unlike rubbers of the related arts.

On the other hand, Comparison Examples 1 to 7 exhibited lower values for the grip performance and the rolling resistance and did not show that both of the properties were simultaneously improved. That is, compared to Comparative Example 2, which is a basic form in which only oil was added, Comparative Example 1 in which terpene resin was additionally added, Comparative Example 3 in which polyisobutylene succinic anhydride (PIBSA-1) was additionally added, and Comparative Examples 4 to 7 in which polyisobutylene having a low terminal vinylidene content is used, the grip performance was superior, but the rolling resistance was inferior. However, the polybutene derivatives prepared using highly reactive polyisobutylene as in Examples 1-1 to 4-3 improved both the grip performance and the rolling resistance.

What is claimed is:

1. A polybutene derivative for rubber compounding, the polybutene derivative being prepared by mixing:
   30% to 98% by weight of polyisobutylene, based on a total weight of a mixed composition before a reaction;
   1% to 35% by weight of unsaturated dicarboxylic anhydride, based on the total weight of the mixed composition before the reaction; and
   1% to 50% by weight of at least one selected from among alkanolamines, amine-based compounds, and polyhydric alcohols, based on the total weight of the mixed composition before the reaction.

2. The polybutene derivative of claim 1, wherein the polyisobutylene has a number average molecular weight of 300 to 10,000 g/mol.

3. The polybutene derivative of claim 1, wherein the polyisobutylene has a polydispersity of 1 to 6.

4. The polybutene derivative of claim 1, wherein the unsaturated dicarboxylic anhydride comprises at least one selected from among maleic anhydride, itaconic anhydride, citraconic anhydride, propenyl succinic anhydride, and 2-pentendioic anhydride.

5. The polybutene derivative of claim 1, wherein the alkanolamine includes an amino group and a hydroxy group, the amine-based compound includes two or more amino groups, and the polyhydric alcohol includes two or more hydroxy groups.

6. The polybutene derivative of claim 5, wherein the alkanolamine is a compound represented by Formula 1, the amino compound is a compound represented by Formula 2, and the polyhydric alcohol is a compound represented by Formula 3,

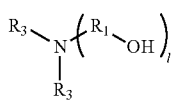
[Formula 1]

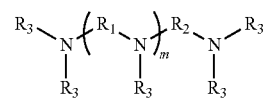
[Formula 2]

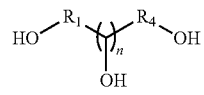
[Formula 3]

In Chemical Formula 1 to 3,
$R_1$ and $R_2$ are each independently a C1-C9 alkylene group or a C1-C9 alkyl carbonylene group,
$R_3$ is hydrogen, a C1-C9 alkyl group, or a C1-C9 alkyl carbonyl group,
$R_4$ is a directly bound, C1-C9 alkylene group or C1-C9 alkyl carbonyl group,
$l$ is a real number in a range of from 1 to 3, and
$m$ and $n$ are each independently a real number in a range of from 0 to 6.

7. The polybutene derivative of claim 5, wherein the alkanolamine compound is at least one selected from among ethanolamine, diethanolamine, triethanolamine, amino methanol, normal-propanolamine, isopropanol amine, diisopropanolamine, triisopropanolamine, butanolamine, dibutanolamine, tributanolamine, and 4-amino-1,2,3-butanetriol, or
   the amine-based compound is at least one selected from among ethylene diamine, diethylenetriamine, triethylenetetraamine, tetraethylenepentaamine, pentaethylenehexaamine, hexaethyleneheptaamine, putrescine, spermidine, $N^1$-acetylspermidine, $N^8$-acetylspermidine, $N^1,N^{12}$-diacetylspermidine, cadaverine, spermine, thermospermine, caldopentamine, caldohexamine, tris(3-aminopropyl)amine, tris(2-aminoethyl)amine, tetrakis(3-aminopropyl)ammonium, cyclen, 1,4,7-triazacyclononane, 1,1,1-tris (aminomethyl)ethane, and subunits of polyethylenimine, or
   the polyhydric alcohol compound is at least one selected from among ethylenediol, 1,2-propylenediol, glycerol, 1,3-propanediol, 1,2-butanediol, 1,2,3-butanetriol, 1,2,4-butanetriol, 1,2-pentanediol, 1,3,5-pentanetriol, 2,3,4-pentanetriol, 1,2,4-pentanetriol, 1,2,5-pentanetriol, 1,2-Hexanediol, 1,6-hexanediol, 1,2,6-hexanetriol, 1,2,3-hexanetriol, 1,2,5-hexanetriol, 1,2,4-hexanetriol, 1,3,6-hexanetriol, 1,2-heptanediol, 1,2,3-heptanetriol, 1,2,7-heptanetriol, 1,4,5-heptanetriol, 1,4,7-heptanetriol, 1,2-octanediol, 1,1,3-octanetriol, 1,3,8-octanetriol, 2,3,7-octanetriol, 1,3,5-octanetriol, 1,2-nonanediol, 1,2-decanediol, sugar alcohol having 4 to 6 carbon atoms, and span.

8. The polybutene derivative of claim 1, wherein the polybutene derivative manufactured using the alkanolamine includes at least one selected from among an imide group, an amide group, and an ester group.

9. The polybutene derivative of claim 1, wherein the polybutene derivative manufactured using the amine-based compound includes at least one selected from among an imide group and an amide group.

10. The polybutene derivative of claim 1, wherein the polybutene derivative manufactured using the polyhydric alcohol includes an ester group.

11. The polybutene derivative of claim 1, wherein the polybutene derivative has a glass transition temperature of −40° C. or lower.

12. The polybutene derivative of claim 1, wherein the polybutene derivative has a Brooke field viscosity of 1 to 10,000 cP at 150° C.

13. The polybutene derivative of claim 1, wherein the polybutene derivative has a number average molecular weight of 500 to 15,000 g/mol.

14. The polybutene derivative of claim 1, wherein the polybutene derivative has a polydispersity of 1 to 6.

15. A rubber composition comprising:
the polybutene derivative of claim 1;
a rubber base; and
a filler.

16. The rubber composition of claim 15, wherein the filler comprises at least one selected from among silica, carbon black, and both.

17. The rubber composition of claim 15, wherein the rubber base comprises at least one selected from among butadiene rubber, butyl rubber, emulsion polymerization styrene butadiene rubber (E-SBR), solution polymerization styrene butadiene rubber (S-SBR), epichlorohydrin rubber, nitrile rubber, hydrogenated nitrile rubber, brominated polyisobutylisoprene-co-paramethyl styrene (BIMS) rubber, urethane rubber, fluoro rubber, silicone rubber, styrene-ethylenebutadiene styrene copolymer rubber, ethylenepropylene rubber, ethylenepropylenediene monomer rubber, hypalon rubber, chloroprene rubber, ethylene vinyl acetate rubber, and acrylic rubber.

18. The rubber composition of claim 15, wherein the rubber composition comprises 50 to 150 parts by weight of silica, 5 to 20 parts by weight of carbon black, 2 to 40 parts by weight of the polybutene derivative, and 2 to 15 parts by weight of a silane coupling agent, with respect to 100 parts by weight of the rubber base.

* * * * *